3,057,855
PROCESS FOR PREPARING POLYSACCHARIDE SULFATES
Herbert E. Smith and Charles R. Russell, both of 1815 N. University St., Peoria, Ill.
No Drawing. Filed June 23, 1961, Ser. No. 128,615
1 Claim. (Cl. 260—233.5)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for effecting sulfation of polysaccharide materials, such as starch, modified starches, and cereal flours, utilizing a novel polymeric tertiary amine-sulfur trioxide adduct as the sulfating agent to produce sulfated polysaccharides having improved adhesive qualities over prior art polysaccharide sulfates. More specifically, the invention concerns the sulfation of polysaccharide materials with relatively low concentrations of the novel compound poly-2-vinylpyridine-sulfur trioxide as the sulfating agent in an aqueous medium at moderate temperatures.

Prior art sulfating agents include sulfuric acid, oleum, sulfur trioxide, chlorosulfonic acid, and acid sulfates and complexes such as sulfur trioxide complexes of tertiary alkyl amines and of aromatic, heterocyclic, and of arylaliphatic amines, of N-alkylethylene carbamates, cyclic ethers, and $\beta,\beta'$-dihalogenated aliphatic ethers.

Wurzburg et al., U.S. 2,786,833, introduced the sulfate group into starch using sulfur trioxide adducts of tertiary alkyl amines as sulfating agents in an aqueous alkaline medium, the reaction mixture having a pH of at least 9, at various temperatures and reaction periods. Jones, U.S. 2,697,093, prepared polysaccharide sulfates from starch, cellulose, and dextrin using sulfur trioxide complexes of pyridine, dioxane, N,N-dimethylaniline or of $\beta,\beta'$-dichlorodiethyl ether as sulfating agents in a solvent consisting of pyridine or other tertiary amines, this solvent having the property of forming complexes or compounds with any acidic substance which might form in the reaction zone. Either during the sulfating operation or subsequent thereto, the product is contacted with metal ions, preferably the alkali metal ions provided by sodium chloride, sodium bromide, sodium hydroxide, and their potassium analogues, and the reactants are stirred for reaction periods ranging from 2 to 14 hours at temperatures ranging from 40° to 115° C.

Sulfating procedures employing sulfuric acid, oleum, sulfur trioxide, acid sulfates, or chlorosulfonic acid, as sulfating agents for organic compounds have been subject to extensive prior investigation, but all of these methods have decided disadvantageous with regard to the production of polysaccharide sulfates. Among the disadvantages of using the above prior art agents for sulfating polysaccharides are: the tendency of the sulfating agent to char the organic material leading to the formation of undesirably discolored decomposition products; the formation of water during the reaction which dilutes the reaction mixture and reduces the activity of the sulfating agent; the difficulties encountered in the isolation of the product and the recovery of solvents, acid acceptors, etc.; the excessive chain cleavage of the polysaccharide material; the inability to control the extent of reaction and uniformity of the products; and the very low yields of sulfated products.

Sulfur trioxide adducts of monomeric tertiary amines have the following disadvantages with regard to their use as sulfating agents in the production of polysaccharide sulfates. These agents have very objectional odors; they adsorb to the polysaccharide and can not be completely removed by known practical methods, such as extraction, evaporation, or washing. The presence of residual amines in sulfates of polysaccharides has prevented the latter materials from gaining wide industrial application and commercial acceptance. Other objections to the presence of these prior art amines are that they interfere with the function of the polysaccharide sulfates in many applications. For example, when polysaccharide sulfates are used for adhesive and sizing purposes the residual amines react with carbon dioxide in the air to form crystalline carbonates which disrupt surface smoothness and reduce the strength of the adhesive bond. The residual amines are hygroscopic and interfere with setting or drying of the adhesive; furthermore, they corrode copper and brass parts of machines used in applying the adhesive or size.

Many of these same defects are common also to the prior art N-alkylethylene carbamate-sulfuric anhydride complexes. The N-alkylethylene carbamates likewise can not be completely removed by practical means and the residual carbamates hydrolyze in aqueous systems to amines having the objectional features outlined above.

Sulfation of polysaccharides with sulfuric anhydride complexes of ethers leads to excessive degradation of the polysaccharide unless the system is buffered with pyridine or some other tertiary amine. This, of course, leads to the same problems encountered with the above tertiary amine-sulfuric anhydride complexes.

A principal object of this invention is to provide a novel and superior sulfating agent which is free of the objectionable features of the prior art sulfating agents. Another object is to provide an improved process for sulfating polysaccharide materials. Still another object is to prepare and obtain sulfated polysaccharide adhesives having markedly improved properties over the sulfated polysaccharides prepared with the prior art sulfating agents.

In accordance with our invention, a 5-percent (dry basis) aqueous slurry respectively of starch, modified starch or wheat flour, is stirred and heated in water until gelatinization of the polysaccharide material occurs. Then the paste is cooked at 90° to 95° C. for an additional 30 minutes, and after the polysaccharide paste is cooled to 40° C. it is reacted with our novel sulfating agent comprising the sulfur trioxide adduct of a specific polymeric tertiary amine (defined below) at 50° to 51° C. for one or more hours. The sulfated polysaccharide is isolated from the reaction mixture by precipitation with methyl or ethyl alcohol, preferably ethyl alcohol.

The extent of sulfation is mainly dependent upon the amount of sulfating agent employed. Using 6.0 parts of our novel sulfating agent, namely the poly-2-vinylpyridine-sulfur trioxide adduct, as the sulfating agent for 50–51.5 parts (dry basis) of polysaccharide material results in a sulfated polysaccharide containing an average sulfur content of 0.82 percent. Poly-2-vinylpyridine-sulfur trioxide was found to be 72 percent hydrolyzed after one hour, in water at 25° C. We found that extending the reaction time beyond one hour during the sulfating process had little effect upon the extent of sulfation achieved although the yield was slightly reduced, apparently because of a competing hydrolysis. The sulfated products of this invention are dispersible in cold water to give pastes that are quick setting, and exhibit unusual tackiness and adhesive characteristics.

Some of the advantages in the sulfation of polysaccharide materials according to the embodiments of this invention are: the use of water as the reaction medium; the extremely small amount of sulfating agent required to give products with improved adhesive properties; the ease with which the degree of sulfation may be regulated and chain scission of the polysaccharide controlled; the odorless nature of the residual polyamine; the sulfating agent's solubility in aqueous systems and its compatibility with the polysaccharide sulfate which obviate the need for its removal; the fact that almost quantitative yields of polysaccharide sulfates are obtained.

Moreover, the present process provides a method of producing sulfated starches and flours having markedly improved adhesive strengths and having reduced paste viscosity over the prior art polysaccharide sulfates. The combination of reduced viscosity and high adhesive strength is most unusual, and makes these polysaccharide sulfates highly attractive for a number of uses such as adhesives for gummed tapes and labels, as tub-sizing agents for paper, and in other various related areas where high adhesive strength is sought and paste viscosity at high solids content must be low to assure high speed machine application.

PREPARATION OF THE POLYMERIC AMINE ADDUCT

Our novel tertiary polymeric amine-sulfur trioxide adduct, poly-2-vinylpyridine-sulfur trioxide, used as the sulfating agent in this invention may be prepared as follows: Crude 2-vinylpyridine was redistilled under reduced pressure (B.P., 64°–68° C./26 mm.) and polymerized according to the procedure of Harmon, U.S. 2,491,472, Example II, to give poly-2-vinylpyridine. Analyses for carbon, hydrogen, and nitrogen based on the monomeric unit of the polymer are: C, calcd., 79.96%; found: 79.41%; H, calcd., 6.71%; found: 6.68%; N, calcd., 13.31%; found: 13.18%. Redistilled chloroform 524.5 g. (4.39 moles) was introduced into a reaction flask, the stirrer was started, and then 30 g. (0.28 mole) of poly-2-vinylpyridine was added and stirred to effect solution. The amber-colored solution was cooled to 18° C. externally by a solid carbon dioxide bath. Twenty-five grams (0.31 mole) of liquid sulfur trioxide was added dropwise to the cold solution under continuous stirring over a 160-minute period in an anhydrous system while maintaining the temperature of the reaction mixture between 18° and 20° C. The gumlike, slightly colored material was removed from the reaction vessel, and the crude reaction product was blended (Waring Blendor) with redistilled chloroform (100 ml.) to insure a more thorough washing and to remove excess sulfur trioxide. The blended material was collected by filtration, washed once again on the filter with redistilled chloroform (25 ml.), and then dried in a vacuum desiccator using phosphorous pentoxide as the desiccant. The light tan product was ground in a Wiley mill using a 20-mesh screen. Yield, 48.7 g. Percent S, calcd., 17.28; found: 16.92.

The following examples which typify the use of our novel sulfating agent will illustrate the superior results obtained using the agent of our invention. However, they are intended as illustrative only and are not intended to in any way limit the invention. All parts are by weight. Yields of the sulfated product are on a dry basis.

Example 1

Hypochlorite oxidized pearl starch (52.5 parts) containing 2.33 carboxyl groups per anhydroglucose unit and 10.5 percent moisture was stirred and heated in 947.5 parts of distilled water to form a gelatinized paste. The paste was stirred and heated an additional 30 minutes at 90°–95° C. With continuous stirring the paste was cooled to 40° C. Then 6 parts of poly-2-vinylpyridine-sulfur trioxide was added and the whole was stirred and heated at 50°–51° C. for 24 hours in a closed system. The reaction product was cooled to 40° C., and then poured into stirred methanol to precipitate the polysaccharide sulfate. After settling, the heavy, sticky product was collected and then partially dehydrated by slurrying in a minimum amount of absolute methanol. The product was collected by filtration and partially dried overnight in a vacuum desiccator over phosphorous pentoxide. The gumlike sulfated material was finally dried in a vacuum oven at 55° C. for 18 hours. The brittle material (46.4 g.) was ground in a Wiley mill using a 40-mesh screen. Analysis: Percent S, 0.70.

Example 2

The same amounts of reactants and the same procedure as outlined in Example 1 was used with the exception that the reaction time was reduced to 2 hours. Yield 48.5 g. Analysis: Percent S, 0.66.

Example 3

The same amounts of reactants and the same method of preparation as described in Example 1 was employed but the reaction period was reduced to 1 hour. Yield, 50.3 g. Analysis: Percent S, 0.71.

It will be noted that the yields increase with the shortening of the reaction time, presumably by avoidance or curtailment of a competing hydrolysis of the product.

Example 4

Commercial pearl corn starch (56.4 parts) containing 12.82 percent moisture was stirred and heated to gelatinization in 943.6 parts of distilled water. The remainder of the sulfation procedure is the same as outlined in Example 1 with the exception that the reaction time was reduced to 1 hour. Yield, 54.2 g. Percent S, 0.68.

Example 5

Commercial pearl corn starch (56.4 parts) containing 12.82 percent moisture was stirred and heated in 943.6 parts of distilled water until gelatinization occurred. The remainder of the procedure is the same as described in Example 1. Yield: 54.0 g. Percent S, 0.66.

Example 6

Hard red winter wheat flour (57.1 parts) containing 13.3 percent moisture was stirred and heated to gelatinization in 942.8 parts of distilled water. The remainder of the sulfation process is the same as described in Example 1 with the exception that the reaction time was reduced to 1 hour. Yield: Percent S, 0.97. Yield, 48.0 g.

Example 7

Hard red winter wheat flour (57.1 parts) containing 13.3 percent moisture was stirred and heated to gelatinization in 942.8 parts of distilled water followed by heating an additional 30 minutes at 90°–95° C. With continuous stirring the paste was cooled to 40° C. Then 3 parts of poly-2-vinylpyridine-sulfur trioxide was added, and the remainded of the procedure is the same as described in Example 1 with the exception that the reaction time was 1 hour. Yield, 44.2 g., percent S, 0.46.

Example 8

The same amounts of reactants and the same procedure as outlined in Example 7 was used with the exception that the reaction time was extended to 2 hours. Yield, 48.6 g., percent S, 0.57.

Example 9

Hard red winter wheat flour (57.1 parts) containing 13.3 percent moisture was stirred and heated to gelatinization in 942.8 parts of distilled water. The paste was stirred and heated an additional 30 minutes at 90°–95° C. With continuous stirring the paste was cooled to 40° C. Then 12 parts of poly-2-vinylpyridine-sulfur trioxide was added, and the remainder of the procedure is the same as described in Example 7. Yield 50.4 g., percent S, 1.30.

Example 10

Commercial pearl corn starch (56.4 parts) containing 12.82 percent moisture was stirred and heated in 943.6 parts of distilled water until gelatinization was achieved. The paste was stirred and heated an additional 30 minutes at 90°–95° C. The remainder of the procedure is the same as described in Example 7. Yield, 51.1 g. Percent S, 0.33.

*Example 11*

The same amounts of reactants and the same procedure as outlined in Example 10 was used with the exception that the reaction time was extended to 2 hours. Yield, 52.7 g. Percent S, 0.38.

*Example 12*

Commercial pearl corn starch (56.4 parts) containing 12.82 percent moisture was stirred and heated in 943.6 parts of distilled water until gelatinization occurred. The remainder of the procedure is the same as described in Example 9. Yield, 59.0 g. Percent S, 1.32.

TESTS OF ADHESIVENESS

The tensile and adhesive properties of the polysaccharide sulfates of this invention were determined using the Tinius Olson Plastiversal, No. 36358, following a slight modification of the "Standard Method of Test of Tensile Properties of Adhesives," ASTM: D897–49. Instead of the circular test specimens therein used for wood-to-wood adhesives, notched rectangular specimens of hard maple with 1 inch square surfaces and being 2 inches in length were employed. The sulfated polysaccharide adhesives were prepared for test as follows: 0.6 g. respectively of each of our polysaccharide sulfates, as well as controls comprising unmodified starch, dextrin, wheat flour, an unadducted simple mixture of oxidized starch and poly-2-vinylpyridine and hard red winter wheat flour sulfated with trimethylamine sulfur dioxide were treated with 1.2 ml. of distilled water, and mixed into respective pastes by stirring manually at room temperature. Each adhesive was applied to seven pairs of test specimens which were then pressed together by hand, and allowed to stand for 24 hours at room temperature prior to testing. Also 0.6 g. each of unmodified starch, dextrin, wheat flour, and mixtures of oxidized starch and poly-2-vinylpyridine were treated with 1.2 ml. of distilled water, mixed well by stirring manually, and then gelatinized in boiling water. The hot pastes were applied to the test specimens which were then pressed together by hand and allowed to stand for 24 hours at room temperature prior to testing. The glued test specimens were placed into the special clamp of the Plastiversal and pulled apart at a uniform cross-head speed of 1 inch per minute under machine loads of 0 to 500 pounds and 0 to 2,000 pounds, respectively, depending upon the requirement of the sample being tested. The mean tensile values of the materials tested are given in Table I. For comparative purposes tensile strengths of gelatinized polysaccharide materials listed under "Hot Paste" in Table I are included because the polysaccharide sulfates of this invention were pregelatinized prior to sulfation.

*Table I*

TENSILE PROPERTIES OF POLYSACCHARIDE SULFATES AND UNMODIFIED POLYSACCHARIDE MATERIALS

| Sample Description | Average tensile strength (p.s.i.) | |
|---|---|---|
| | Cold paste | Hot paste |
| Sulfated oxidized pearl corn starch of Example 3 | 2,084.0 | |
| Sulfated oxidized pearl corn starch of Example 2 | 1,730.0 | |
| Sulfated pearl corn starch of Example 4 | 1,616.0 | |
| Sulfated hard red winter wheat flour of Example 6 | 1,296.0 | |
| Sulfated hard red winter wheat flour [1] | 647.6 | 931.6 |
| Unmodified oxidized pearl corn starch | 85.6 | 922.8 |
| Unmodified pearl corn starch | 0.0 | 1,008.9 |
| Unmodified canary dextrin | 2.0 | |
| Unmodified oxidized pearl corn starch and poly-2-vinylpyridine (10:1) | 109.4 | 856.8 |

[1] Sulfating agent was trimethylamine-sulfur dioxide.

Having fully disclosed our invention, we claim:

A process of preparing polysaccharide sulfate adhesives comprising gelatinizing a 5 percent aqueous slurry of a polysaccharide material selected from the group consisting of unmodified starch, hypochlorite-oxidized starch, and wheat flour to form a paste, cooking the paste for an additional 30 minutes at 90–95° C., allowing the paste to cool to 40° C., reacting about 50 parts (dry basis) of the paste with at least about 3 parts of poly-2-vinyl-pyridine-sulfur trioxide having a sulfur content of 16.92 percent in a closed system at 50–51° C. for at least 1 hour, precipitating the polysaccharide sulfate reaction product in a lower alcohol, and recovering the precipitated polysaccharide sulfate therefrom.

References Cited in the file of this patent
UNITED STATES PATENTS

| | | |
|---|---|---|
| 2,491,472 | Harmon | Dec. 20, 1949 |
| 2,691,644 | Roth | Oct. 12, 1954 |
| 2,697,093 | Jones | Dec. 14, 1954 |
| 2,786,833 | Wurzburg et al. | Mar. 26, 1957 |
| 2,809,960 | Roth | Oct. 15, 1957 |